United States Patent
DiGiovanni

(10) Patent No.: US 8,277,722 B2
(45) Date of Patent: Oct. 2, 2012

(54) PRODUCTION OF REDUCED CATALYST PDC VIA GRADIENT DRIVEN REACTIVITY

(75) Inventor: Anthony A. DiGiovanni, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 232 days.

(21) Appl. No.: 12/568,966

(22) Filed: Sep. 29, 2009

(65) Prior Publication Data
US 2011/0073380 A1  Mar. 31, 2011

(51) Int. Cl.
*E21B 10/46* (2006.01)
(52) U.S. Cl. .................................................. 419/10
(58) Field of Classification Search ............... 419/10
See application file for complete search history.

(56) References Cited

U.S. PATENT DOCUMENTS

| | | |
|---|---|---|
| 3,745,623 A | 7/1973 | Wentorf, Jr. et al. |
| 4,311,490 A | 1/1982 | Bovenkerk et al. |
| 4,403,015 A | 9/1983 | Nakai et al. |
| 4,604,106 A | 8/1986 | Hall |
| 4,664,705 A | 5/1987 | Horton et al. |
| 4,729,440 A | 3/1988 | Hall |
| 4,802,895 A | 2/1989 | Burnand et al. |
| 4,820,482 A | 4/1989 | Fischer et al. |
| 4,940,180 A | 7/1990 | Martell |
| 5,127,923 A | 7/1992 | Bunting et al. |
| 5,217,081 A | 6/1993 | Waldenström et al. |
| 5,248,317 A | 9/1993 | Tank et al. |
| 5,264,283 A | 11/1993 | Waldenström et al. |
| 5,370,195 A | 12/1994 | Keshavan et al. |
| 5,441,817 A | 8/1995 | Rai |
| 5,496,638 A | 3/1996 | Waldenström et al. |
| 5,498,480 A | 3/1996 | Tank et al. |
| 5,624,068 A | 4/1997 | Waldenström et al. |
| 5,645,617 A | 7/1997 | Frushour |
| 5,954,147 A | 9/1999 | Overstreet et al. |
| 6,342,301 B1 | 1/2002 | Yoshida et al. |
| 6,443,248 B2 | 9/2002 | Yong et al. |
| 6,544,308 B2 | 4/2003 | Griffin et al. |
| 6,562,462 B2 | 5/2003 | Griffin et al. |
| 6,585,064 B2 | 7/2003 | Griffin et al. |
| 6,589,640 B2 | 7/2003 | Griffin et al. |
| 6,592,985 B2 | 7/2003 | Griffin et al. |

(Continued)

FOREIGN PATENT DOCUMENTS
EP   0517510   8/1995

OTHER PUBLICATIONS

Cao et al., Optimization Design and Residual Thermal Stress Analysis of PDC Functionally Graded Materials, Journal of Zhejiang University Science A (2006), vol. 7, No. 8, pp. 1318-1323.

(Continued)

*Primary Examiner* — Archene Turner
(74) *Attorney, Agent, or Firm* — TraskBritt

(57) ABSTRACT

A method of forming a PDC cutter having solvent metal catalyst located adjacent the diamond and/or in the diamond and a layer of reactive material on the layer of diamond, the layer of reactive material for promoting the flow of the solvent metal catalyst material from the layer of diamond under high pressure and high temperature.

23 Claims, 8 Drawing Sheets

U.S. PATENT DOCUMENTS

| | | | |
|---|---|---|---|
| 6,601,662 B2 | 8/2003 | Matthias et al. | |
| 6,620,375 B1 | 9/2003 | Tank et al. | |
| 6,739,214 B2 | 5/2004 | Griffin et al. | |
| 6,749,033 B2 | 6/2004 | Griffin et al. | |
| 6,797,326 B2 | 9/2004 | Griffin et al. | |
| 6,861,098 B2 | 3/2005 | Griffin et al. | |
| 6,861,137 B2 | 3/2005 | Hughes et al. | |
| 6,869,460 B1 | 3/2005 | Bennett et al. | |
| 6,878,447 B2 | 4/2005 | Griffin et al. | |
| 7,396,501 B2 | 7/2008 | Pope et al. | |
| 7,473,287 B2 * | 1/2009 | Belnap et al. | 428/408 |
| 7,487,849 B2 | 2/2009 | Radtke | |
| 7,493,973 B2 * | 2/2009 | Keshavan et al. | 175/434 |
| 7,569,179 B2 | 8/2009 | Fang | |
| 7,608,333 B2 * | 10/2009 | Eyre | 428/408 |
| 7,757,793 B2 * | 7/2010 | Voronin et al. | 175/435 |
| 7,942,219 B2 * | 5/2011 | Keshavan et al. | 175/434 |
| 8,061,454 B2 * | 11/2011 | Voronin et al. | 175/426 |
| 2002/0034631 A1 | 3/2002 | Griffin et al. | |
| 2005/0050801 A1 | 3/2005 | Cho et al. | |
| 2005/0115744 A1 | 6/2005 | Griffin et al. | |
| 2005/0133277 A1 | 6/2005 | Dixon | |
| 2005/0139397 A1 | 6/2005 | Achilles et al. | |
| 2005/0263328 A1 | 12/2005 | Middlemiss | |
| 2006/0060390 A1 | 3/2006 | Eyre | |
| 2006/0060391 A1 | 3/2006 | Eyre et al. | |
| 2006/0060392 A1 | 3/2006 | Eyre | |
| 2006/0162969 A1 | 7/2006 | Belnap et al. | |
| 2006/0266559 A1 | 11/2006 | Keshavan et al. | |
| 2007/0039762 A1 | 2/2007 | Achilles | |
| 2007/0079994 A1 | 4/2007 | Middlemiss | |
| 2007/0131459 A1 | 6/2007 | Voronin et al. | |
| 2007/0144790 A1 | 6/2007 | Fang et al. | |
| 2007/0181348 A1 | 8/2007 | Lancaster et al. | |
| 2008/0010905 A1 | 1/2008 | Eyre | |
| 2008/0073126 A1 | 3/2008 | Shen et al. | |
| 2008/0142276 A1 | 6/2008 | Griffo et al. | |
| 2008/0179109 A1 | 7/2008 | Belnap et al. | |
| 2008/0230280 A1 | 9/2008 | Keshavan et al. | |
| 2009/0114454 A1 | 5/2009 | Belnap et al. | |
| 2009/0152017 A1 | 6/2009 | Shen et al. | |
| 2009/0173547 A1 | 7/2009 | Voronin et al. | |
| 2011/0023375 A1 | 2/2011 | Sani et al. | |
| 2011/0036643 A1 | 2/2011 | Belnap et al. | |

OTHER PUBLICATIONS

International Search Report for International Application No. PCT/US2010/049671 mailed Apr. 28, 2011, 3 pages.

International Written Opinion for International Application No. PCT/US2010/049671 mailed Apr. 28, 2011, 3 pages.

International Preliminary Report on Patentability for International Application No. PCT/US2010/049671 dated Apr. 3, 2012, 5 pages.

* cited by examiner

PRODUCTION OF REDUCED CATALYST PDC VIA GRADIENT DRIVEN REACTIVITY

TECHNICAL FIELD

The present invention, in several embodiments, relates generally to polycrystalline diamond compact (PDC) cutters and methods of making PDC cutters for rotary drag bits for drilling subterranean formations.

BACKGROUND

Rotary drag bits have been used for subterranean drilling for many decades, and various sizes, shapes and patterns of natural and synthetic diamonds have been used on drag bit crowns as cutting elements. In many formations, a drag bit can provide an improved rate of penetration (ROP) of the drill bit during drilling over the ROP of a tri-cone drill bit.

Over the past few decades, rotary drag bit performance has been improved with the use of a polycrystalline diamond compact (PDC) cutting element or cutter, comprised of a planar diamond cutting element or table formed onto a tungsten carbide substrate under high temperature and high pressure conditions. The PDC cutters are formed into a myriad of shapes including, circular, semicircular or tombstone, which are the most commonly used configurations. Typically, the PDC diamond tables are formed so the edges of the table are coplanar with the supporting tungsten carbide substrate. Bits carrying PDC cutters, which for example, may be brazed into pockets in the bit face, pockets in blades extending from the face, or mounted to studs inserted into the bit body, have proven very effective in achieving a high rate of penetration (ROP) in drilling subterranean formations exhibiting low to medium compressive strengths. The PDC cutters have provided drill bit designers with a wide variety of improved cutter deployments and orientations, crown configurations, nozzle placements and other design alternatives previously not possible with the use of small natural diamond or synthetic diamond cutters. While the PDC cutting element improves drill bit efficiency in drilling many subterranean formations, the PDC cutting element is nonetheless prone to wear when exposed to certain drilling conditions, resulting in a shortened life of a rotary drag bit.

PDC cutters comprise combining synthetic diamond grains with a suitable solvent catalyst material to form a mixture. The mixture is subjected to processing conditions of extremely high pressure/high temperature (HPHT) where the solvent catalyst material promotes desired inter-crystalline diamond-to-diamond bonding between the grains, thereby forming a PDC structure. The resulting PDC structure has enhanced properties of wear resistance and hardness. PDC materials are useful in aggressive wear and cutting applications where high levels of wear resistance and hardness are desired. The cutting elements used in such earth-boring tools often include polycrystalline diamond compact (often referred to as "PDC") cutting elements, which are cutting elements that include cutting faces of a polycrystalline diamond material. Polycrystalline diamond material is material that includes inter-bonded grains or crystals of diamond material. In other words, polycrystalline diamond material includes direct, inter-granular bonds between the grains or crystals of diamond material. The terms "grain" and "crystal" are used synonymously and interchangeably herein.

PDC cutters typically include a metallic substrate material that is joined to a layer or body of the PDC material during the same HPHT process that is used to form the PDC body. The metallic substrate facilitates attachment of the PDC cutter to a drill bit. Techniques are used to improve the wear resistance of the PDC cutter which is known to suffer thermal degradation at a temperature starting at about 400° C. and extending to 1200° C. Conventional PDC cutters are known to have poor thermal stability when exposed to operating temperatures above 700° C. Some of the techniques for improving wear resistance of a PDC cutter are directed to improving the thermal stability of the PDC cutter. One technique of improving thermal stability of a PDC cutter is to leach the uppermost layer of PDC cutter to remove substantially all solvent metal catalyst material from the PDC cutter surface while retaining as much metal catalyst material in the remaining portion of the PDC cutter.

While this technique improves the thermal stability of the treated uppermost layer of a PDC cutter, such a PDC cutter tends to suffer from spalling and de-lamination during use.

Therefore, it is desirable to provide a PDC cutter having improved wear resistance properties and thermal stability which reduces or minimizes spalling and de-lamination of the PDC cutter without leaching the uppermost layer of the PDC cutter to remove solvent metal catalyst material from the PDC cutter.

BRIEF SUMMARY

A PDC cutter having solvent metal catalyst material in the diamond and methods of manufacture thereof.

The advantages and features of the present invention will become apparent when viewed in light of the detailed description of the various embodiments of the invention when taken in conjunction with the attached drawings and appended claims.

DETAILED DESCRIPTION

Figure 1:
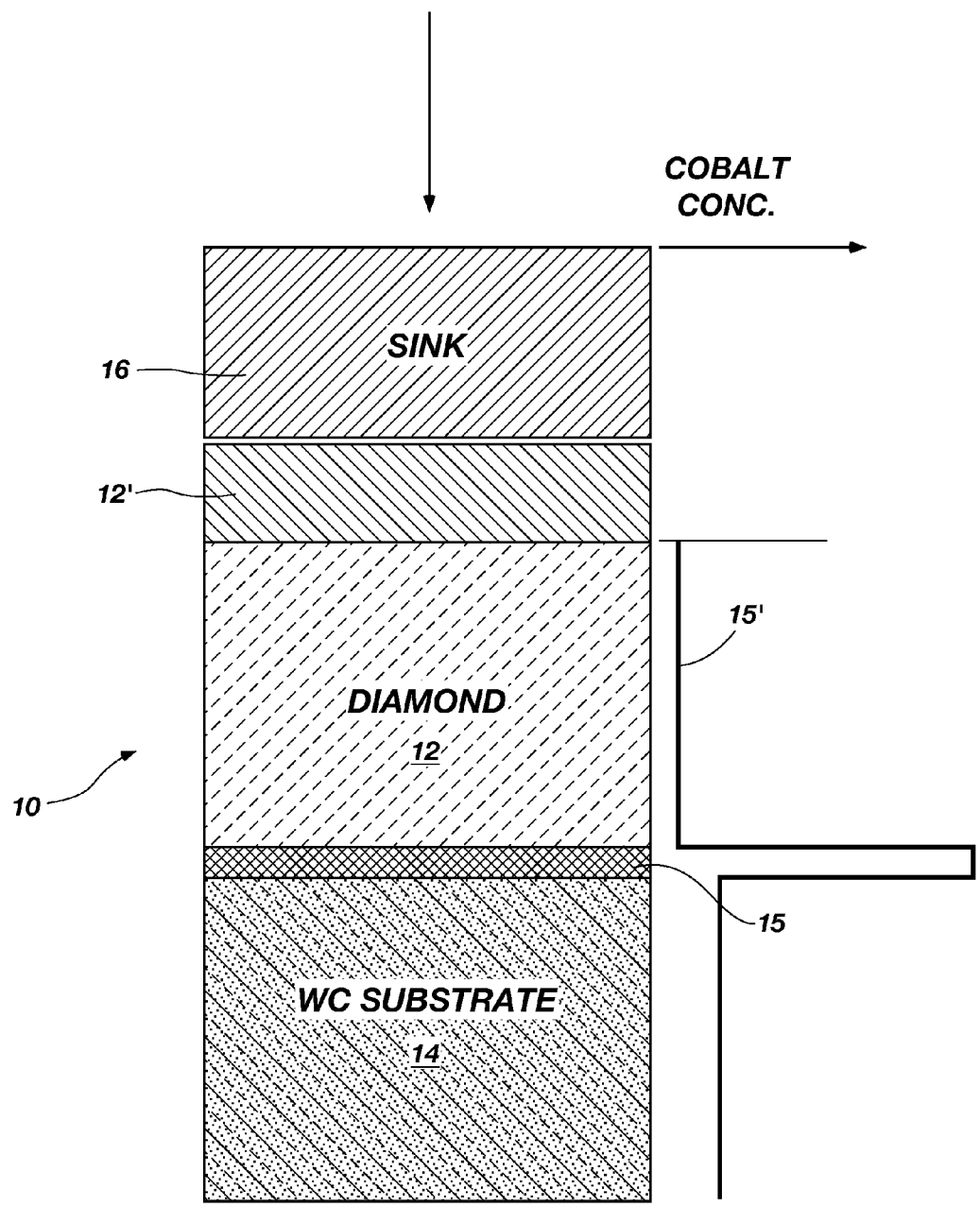
FIG. 1 is a drawing of a PDC compact before pressing.

Illustrated in FIG. 1 is a representation of a compact 10 to be pressed under high pressure and high temperature (HPHT) to form a polycrystalline diamond compact (PDC) for use as a cutter on a rotary drag bit. The compact 10 includes a substrate 14, layer of either powdered solvent catalyst 15 or a solid disc of catalyst 15, a first layer of diamond powder 12, a sacrificial layer or second layer 12' of diamond powder, and a sink 16. The compact 10 includes two layers of diamond powder, a first layer of diamond powder 12 typically having a particle size in the range of about 5 microns to about 40 microns and a second, more coarse sacrificial layer 12' of diamond powder having particle size in the range of about 100 microns to about 500 microns or multi-modal particle size distributions thereof for forming a diamond table for cutting. The layer of powdered solvent catalyst 15, such as cobalt, while illustrated as a separate layer of powdered cobalt, may be mixed within primarily the powdered diamond 12, if desired. The sacrificial layer 12' of diamond powder acts as a catalyst for forming the diamond table and for attaching the polycrystalline diamond table to a substrate 14. The substrate 14 typically comprises a cermet material (i.e., a ceramic-metal composite material) such as, for example, cobalt-cemented tungsten carbide for forming a backup substrate, after pressing. The sink 16 acts as a getter that can react favorably with or adsorb any catalyst, or any suitable metal catalyst, in the diamond powder 12 and in the sacrificial layer 12' of diamond powder to reduce the concentration of the catalyst, or other suitable metal catalyst, in the diamond powder 12, which may be swept into the diamond grains of diamond powder 12 from either the substrate 14, or the layer of powder solvent catalyst 15, or solid catalyst disc 15, during sintering. During sintering, each of substrate 14 and the layer of catalyst 15 serves as catalyst material for forming the inter-granular diamond-to-diamond bonds and, the resulting diamond table, from the diamond grains. In other methods, a layer of powdered catalyst material 15, or any suitable metal catalyst material 15, may additionally be mixed with the diamond grains prior to sintering in an HTHP process. Upon formation of a diamond table 12 using an HTHP process, catalyst material may remain after pressing and cooling to form a diamond microstructure for the diamond table 12 of the compact 10. The sacrificial layer 12' may comprise coarse diamond, carbide, graphite, ceramic, metal, or any suitable mixtures thereof as well as any suitable materials that promote fracturing of the sacrificial layer 12' and allow the migration of catalyst 15 therethrough. The sink 16 may be any suitable material such as fine diamond, graphite, metals, or metal alloys that will react at or, preferably, above the reactivity level of the diamond powder 12. By placing the sink 16 over the diamond powder 12 and sacrificial layer 12', the sink 16 causes a solvent gradient to occur across the diamond powder 12 and sacrificial layer 12' for the solvent catalyst 15 in the diamond powder 12 and sacrificial layer 12' to migrate to the sink 16 during high pressure and high temperature formation of the compact 10. The sacrificial layer 12' of diamond powder acts as a sacrificial layer to be removed after the High Pressure High Temperature (HPHT) portion of the process by any suitable means, such as direct separation of the sacrificial layer 12' of diamond powder from diamond layer 12 or cutting or grinding, or lapping, etc. The sacrificial layer 12' of diamond powder should not remain on the compact 10, although in some instances it may be retained. While coarse diamond powder for the sacrificial layer 12' is preferred to be used, any diamond powder may be used and may include a minimally reacting material therein, if so desired. The sacrificial layer 12' of coarse diamond powder may be in powder form, mixed with a suitable metal, layered, or in any combination thereof. The sacrificial layer 12' of diamond powder should react minimally with the diamond powder layer 12 allowing the catalyst to pass freely through the sacrificial layer 12' of diamond powder with minimal reactivity therewith and should be easily removable from the diamond powder layer 12. In certain instances, the sacrificial layer 12' of diamond powder may not be used and only the solvent catalyst layer 15 used, if the solvent catalyst layer 15 may be easily separated from the powdered diamond layer 12 and the solvent catalyst layer 15 retains the activity thereof without the sacrificial layer 12' of diamond powder after high temperature and high pressure formation of the compact 10.

Figure 1A:
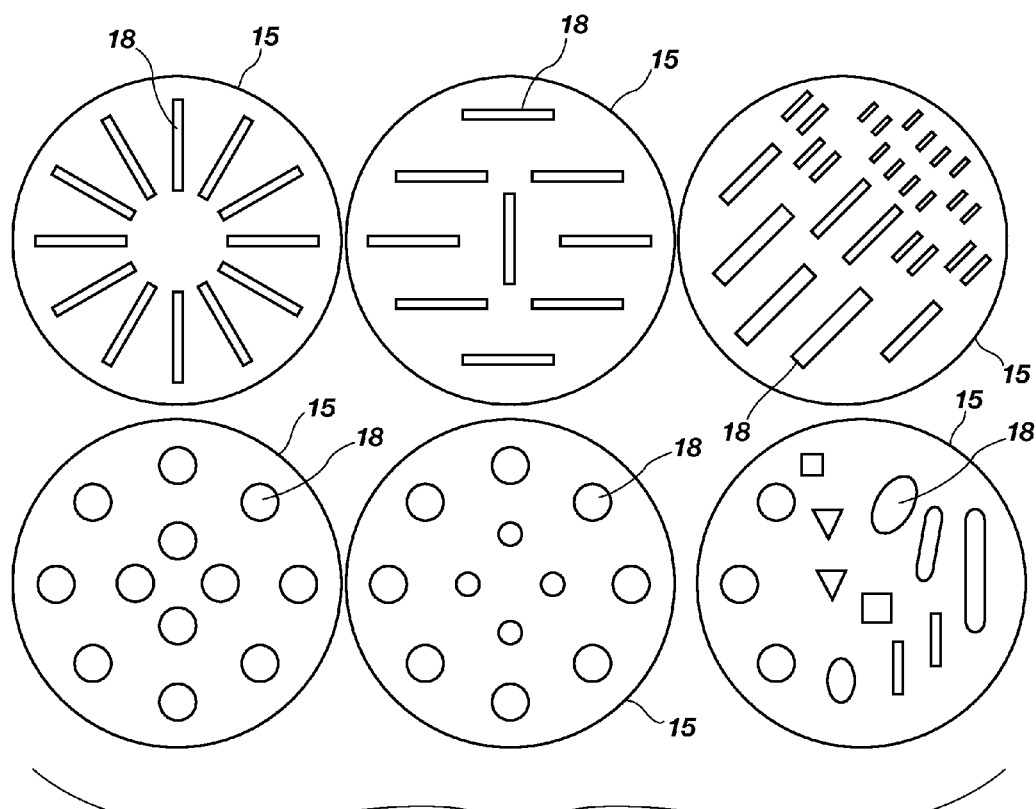
FIG. 1A is a drawing of various patterns for interfacial barrier designs for the control of catalyst migration to the diamond powder and sink.

As illustrated in FIG. 1A, if desired, the layer 15 may consist of a solid metal disc 15 or metal alloy disc 15 having reduced catalytic activity, such as a nickel disc 15. The disc 15 includes a plurality of apertures 18 therein to control the migration of catalyst contained within the substrate 14 into the diamond layer 12 and sacrificial layer 12' to the sink 16. The thickness of the disc 15, or layer of powdered catalyst 15, may be any thickness in the range of approximately 1 micron to approximately 100 microns. The shape of the apertures 18 may be any desired shape, such as circular, square, rectangular, oval, ellipsoid, triangular, or any desired combinations thereof in any desired patterns thereof. The length and width of the apertures 18 may be any desired diameter thereof or length and width thereof convenient for the size of the compact 10. The apertures 18 may have any desired pattern, such as symmetrical, asymmetrical, any desired combinations thereof, etc.

Referring back to FIG. 1, the initial concentration of the solvent catalyst 15 below diamond powder 12 or in the diamond powder 12 is illustrated by the graphic representation of 15' on the right side FIG. 1, showing that the diamond powder 12 and sacrificial layer 12' of diamond powder each have some concentration of solvent catalyst 15 therein while the highest concentration of solvent catalyst 15 is in the catalyst layer 15 at or near the interface of the layer of diamond powder 12. If desired, the wettability of the diamond powder 12 and sacrificial layer 12' can be enhanced with a graphite coating or any other agent to allow the catalyst 15 to migrate more easily to the sink 16 from the diamond powder 12 and sacrificial layer 12'.

Figure 2:
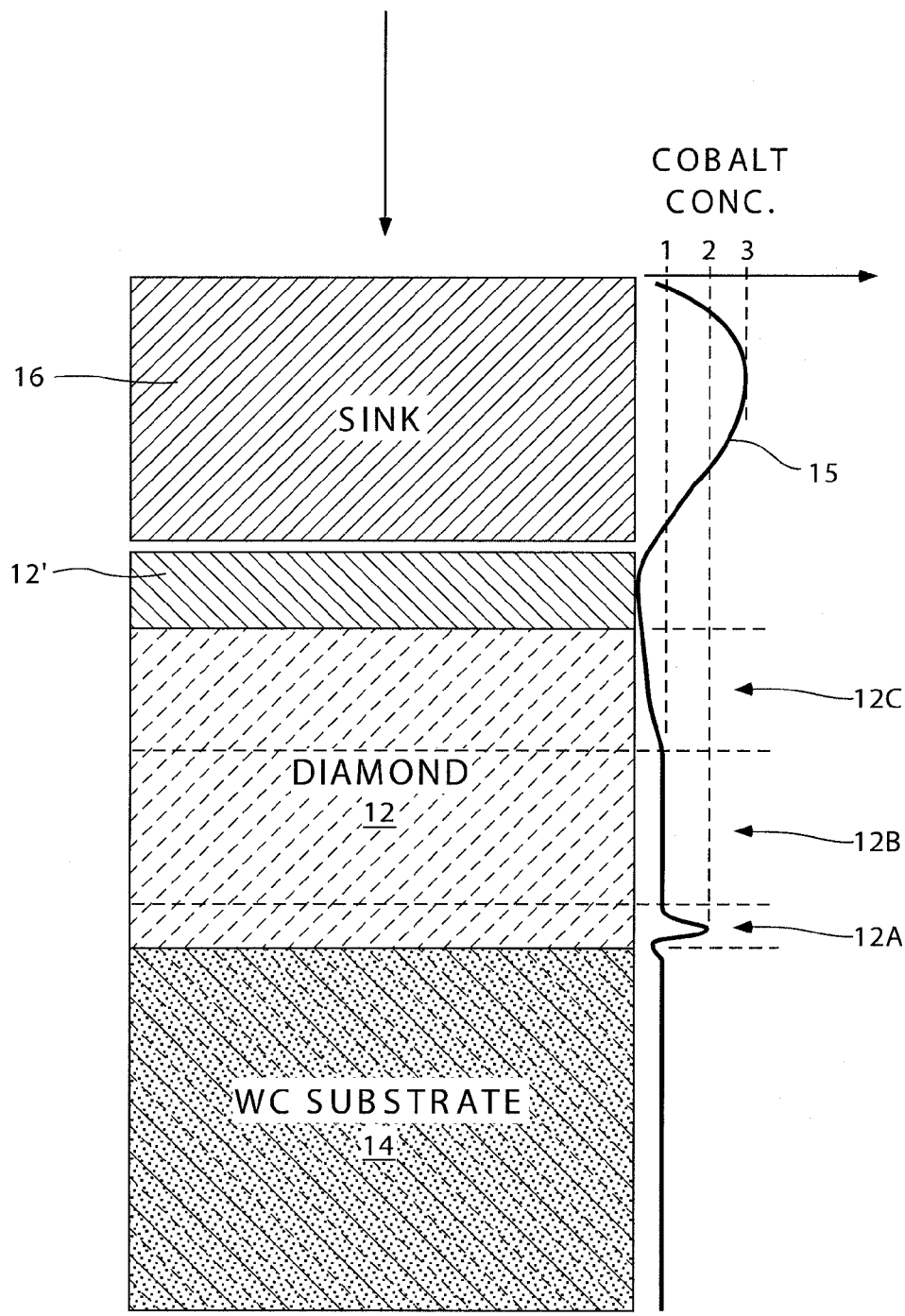
FIG. 2 is a drawing of the PDC of FIG. 1 after pressing.

Illustrated in FIG. 2 is a representation of a compact 10 of FIG. 1, or with the solid disc 15 of FIG. 1A, after high pressure and high temperature pressing of the compact 10. As illustrated on the right side of the compact 10, during high pressure and high temperature pressing of the compact 10, the affinity of the sink material 16 has caused the solvent catalyst material 15 to migrate to the sink 16. As illustrated, the sink 16 has the highest concentration of the cobalt solvent catalyst 15, after high pressure and high temperature pressing of the compact 10. As illustrated, the polycrystalline diamond table 12 formed from the diamond powder 12 and sacrificial layer 12' of diamond powder includes, at or near the WC substrate 14, a first level 12A of concentration of catalyst material having a level of concentration of catalyst of about two times or more of the level of concentration of catalyst in the WC substrate 14, a second level 12B of concentration of catalyst having a level 12B of concentration of about the same level of concentration of catalyst as in the WC substrate 14, and a third level 12C of concentration of catalyst having a level 12C of concentration of catalyst decreasing from about the same level of concentration 12B of catalyst as in the WC substrate 14 to a minimum level of concentration approaching almost no catalyst in the diamond table 12 at the upper end or upper surface thereof, although the amount or concentration of catalyst is as minimal as required for formation of the diamond table 12 of the compact 10. The level of concentration of catalyst in the sacrificial layer 12' of coarse diamond powder 12' is significantly less than that of the level of concentration of the catalyst in the WC substrate 14 with the sink 16 having a level of concentration of catalyst peaking at a level of about three times or more of the level of concentration of the catalyst, in the WC substrate 14. The solvent catalyst layer 15 may be deleted, if desired, when sufficient catalyst material from the substrate 14 is available during HPHT of the compact 10. It will be appreciated that the volume or mass of the material comprising the sink 16 must be at least approximately equal to or larger than the volume or mass of catalyst material, such as from the catalyst layer 15 and any catalyst that may migrate from the substrate 14 that is to be to be removed from the diamond powder 12 and sacrificial layer 12' of diamond powder. Otherwise, the volume or mass of the sink 16 will not be effective for the removal of the desired amount of catalyst material from the layer of catalyst powder 15, or from a solid disc 15, from the layer of diamond powder 12, and from sacrificial layer 12' of diamond powder.

Figure 3:
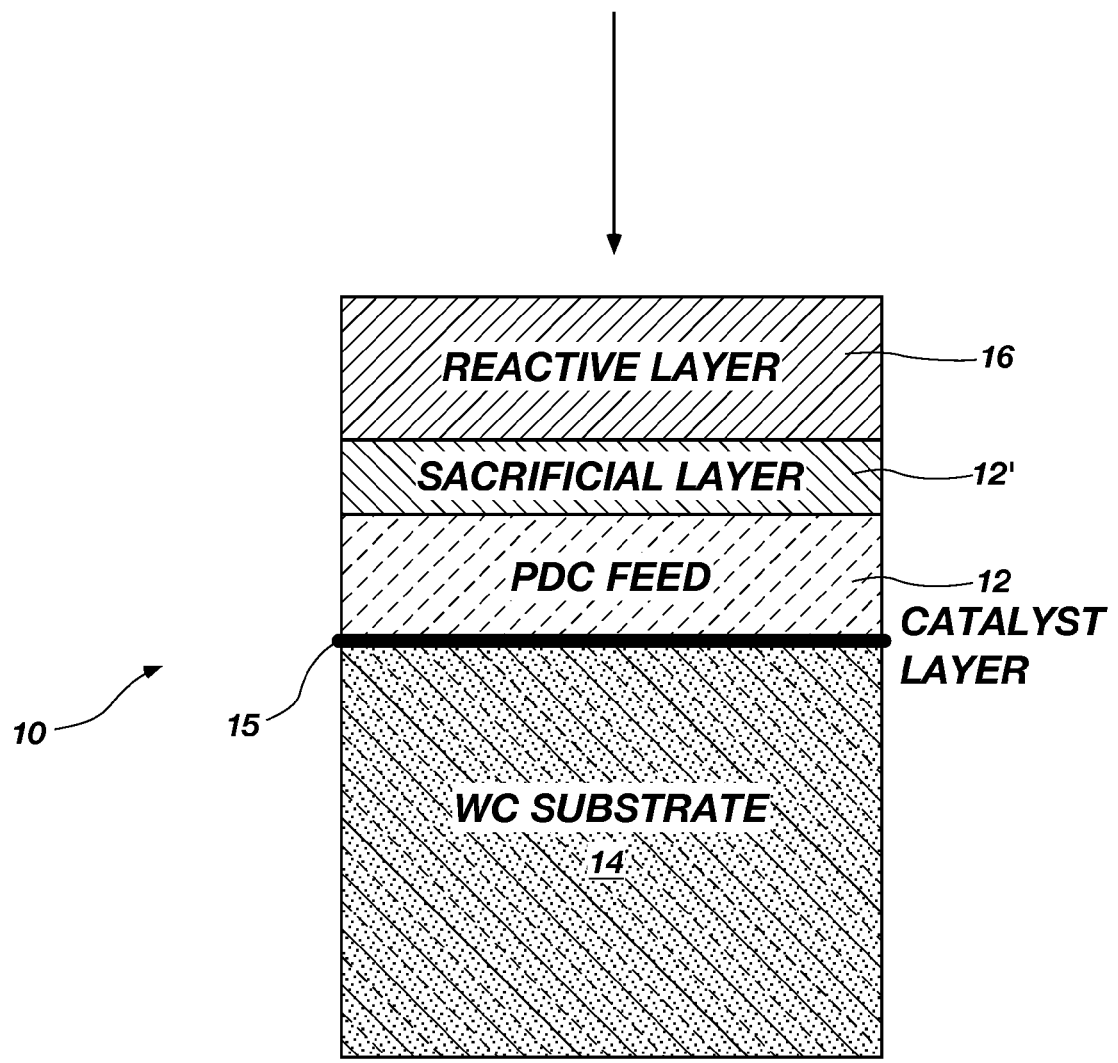
FIG. 3 is a drawing of another embodiment of the present invention of a PDC compact before pressing.

Illustrated in FIG. 3 is another representation of an alternative embodiment of the present invention where a compact 10 is to be pressed under high pressure and high temperature to form a PDC for use as a cutter on a rotary drag bit. The compact 10 includes a substrate 14, a powdered catalyst layer 15, a diamond powder layer 12, a sacrificial layer or second layer 12' of coarse diamond powder, and a sink or reactive layer 16. As illustrated, the compact 10 includes at least two layers of diamond, one of diamond powder 12 (PDC FEED), typically having a particle size of about 5 microns to about 40 microns, and another of sacrificial layer 12' of coarse diamond particles, typically having a particle size of about 100 microns to about 500 microns, for forming a diamond table for cutting. A layer of powdered solvent catalyst 15, such as cobalt powder, or a solid solvent catalyst disc 15, such as an iron and cobalt alloy disc, contacts the powdered diamond 12 for forming the diamond table from the diamond powder 12 and sacrificial layer 12' of diamond powder and attaching the diamond table to a substrate 14, which is formed from tungsten carbide powder for forming a backup substrate for the diamond table after pressing. The sink 16 acts as a getter that can react favorably with the cobalt solvent catalyst 15 to reduce the concentration of the cobalt solvent catalyst 15 in the diamond powder 12 and sacrificial layer 12', after pressing and cooling to form the diamond microstructure of a diamond table 12 of the compact 10. The sink 16 may be any suitable material, such as fine diamond, graphite, metals, or metal alloys that will react at or, preferably, above the reactivity level of the diamond powder 12. By placing the sink 16 over the tungsten carbide powder, the catalyst layer 15, the diamond powder layer 12, and sacrificial layer 12', the sink 16 causes a solvent gradient to occur across the tungsten carbide powder 14 for the cobalt solvent catalyst therein and the catalyst in the catalyst layer 15 to migrate to the sink 16 during high pressure and high temperature formation of the compact 10. Because the coarse diamond powder of the sacrificial layer 12' has a particle size in the range of about 100 microns to about 500 microns, the sacrificial layer 12' will not strongly bond to the diamond layer 12 at the interface therebetween during high pressure and high temperature pressing. The overall permeability of the diamond layer 12 and the permeability of the sacrificial layer 12' of coarse diamond powder is determined by the mean free path of open porosity, which is formed by the interstitial regions between individual grain boundaries between grains, and fractures that form under pressure and determines the effectiveness at which any solvent catalyst migrates therethrough during the high pressure and high temperature process of forming the compact 10, as the closed porosity of the diamond layer 12 and the closed porosity of the sacrificial layer 12' of coarse porous diamond prevents any substantial migration of the catalyst 15 thereacross. When there is a greater amount of permeability in the diamond layer 12 and permeability in the sacrificial layer 12' of coarse porous diamond particle layer, the solvent catalyst 15 will migrate through the diamond layer 12 and the sacrificial layer 12' of coarse porous diamond. If a diamond powder 12 is used that has a mean free path of open porosity below the percolation threshold for the grain size distribution, the permeability of the diamond layer 12 may be such that the catalyst 15 cannot effectively migrate thereacross in any reasonable period of time for the compact 10 formation process.

Figure 4:
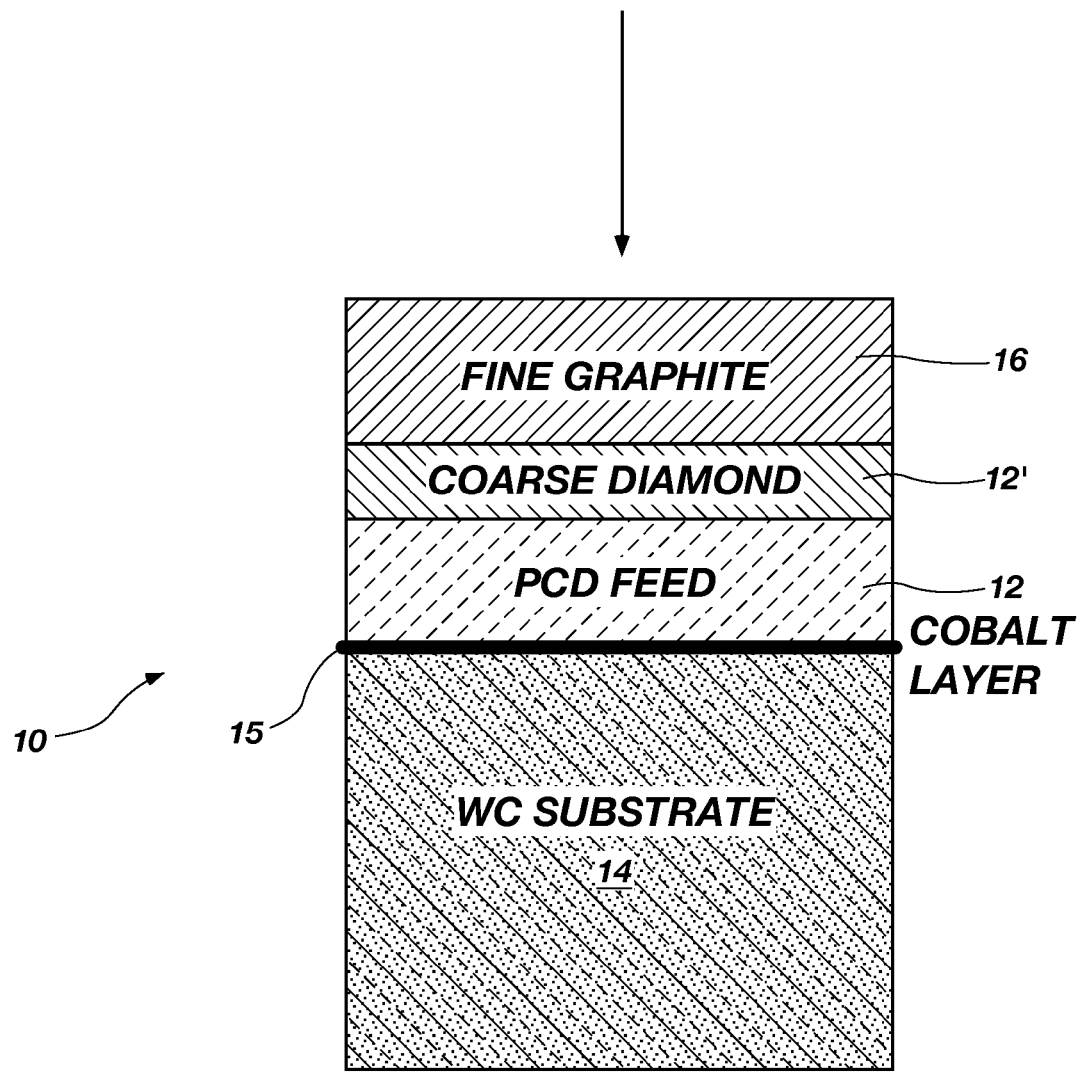
FIG. 4 is a drawing of another embodiment of the present invention of the PDC of FIG. 3 after pressing.

Illustrated in FIG. 4 is another representation of an alternative embodiment of the present invention where a compact 10 is to be pressed under high pressure and high temperature to form a PDC for use as a cutter on a rotary drag bit. The compact 10 includes a substrate 14, a layer of powdered cobalt catalyst 15, a layer of diamond powder 12, another layer of coarse diamond powder 12', and a sink 16 of fine graphite powder. The compact 10 includes at least two layers of diamond, one of diamond powder 12 having a particle size of about 5 microns to about 40 microns and another of sacrificial layer 12' of coarse diamond particles having a particle size of about 100 microns to about 500 microns for forming a diamond table for cutting. A layer of powdered cobalt solvent catalyst 15 contacts the powdered diamond 12 for attaching a diamond table to a substrate 14 formed from tungsten carbide powder for forming a backup substrate for the diamond table formed from the diamond powder 12 and sacrificial layer 12' of coarse diamond particles having the diamond table secured thereto after pressing. A fine graphite powder, such as a sink 16, acts as a getter that can react favorably with the cobalt solvent catalyst 15 to reduce the concentration of the cobalt solvent catalyst in the diamond powder 12, after pressing and cooling to form a diamond microstructure of a diamond table of the compact 10. The fine crystalline graphite powder 16 will react at or, preferably, above the reactivity level of the diamond powder 12 (PCD FEED). By placing the sink 16 opposite the tungsten carbide powder for forming the substrate 14, the cobalt catalyst layer 15, the diamond powder 12, and the sacrificial layer 12' of coarse diamond powder, the sink 16 causes a solvent gradient to occur across the tungsten carbide powder 14, the cobalt powder catalyst layer 15, the diamond powder layer 12 and the sacrificial layer 12' for any cobalt solvent catalyst to migrate to the sink 16 during high pressure and high temperature formation of the compact 10. If desired, a solid solvent catalyst disc 15 may be placed between the diamond layer 12 and the substrate 14, rather than a layer of powdered cobalt catalyst 15. If the sacrificial 12' of coarse porous diamond powder has an average particle size in the range of about 100 microns to about 500 microns, the sacrificial layer 12' of coarse porous diamond particle layer will not strongly bond to the diamond layer 12 at the interface therebetween. The overall permeability of the diamond layer 12 and the permeability of the sacrificial layer 12' of coarse diamond powder determines the effectiveness at which any solvent catalyst migrates therethrough during the high pressure and high temperature process of forming the compact 10, as the closed porosity of the diamond layer 12 and the closed porosity of the sacrificial layer 12' of coarse diamond powder prevents or limits any migration of the catalyst 15 thereacross. When there is greater permeability of the diamond layer 12 and the permeability of the sacrificial layer 12' of coarse diamond powder, the solvent catalyst 15 will migrate with greater effectiveness through the diamond layer 12 and the sacrificial layer 12' of coarse diamond powder. If a diamond powder 12 is used that has a mean free path of open porosity below the percolation threshold for the grain size distribution, the permeability of the diamond layer 12 may be such that the solvent catalyst 15 cannot effectively migrate thereacross in any reasonable period of time for the compact formation process.

Figure 5:
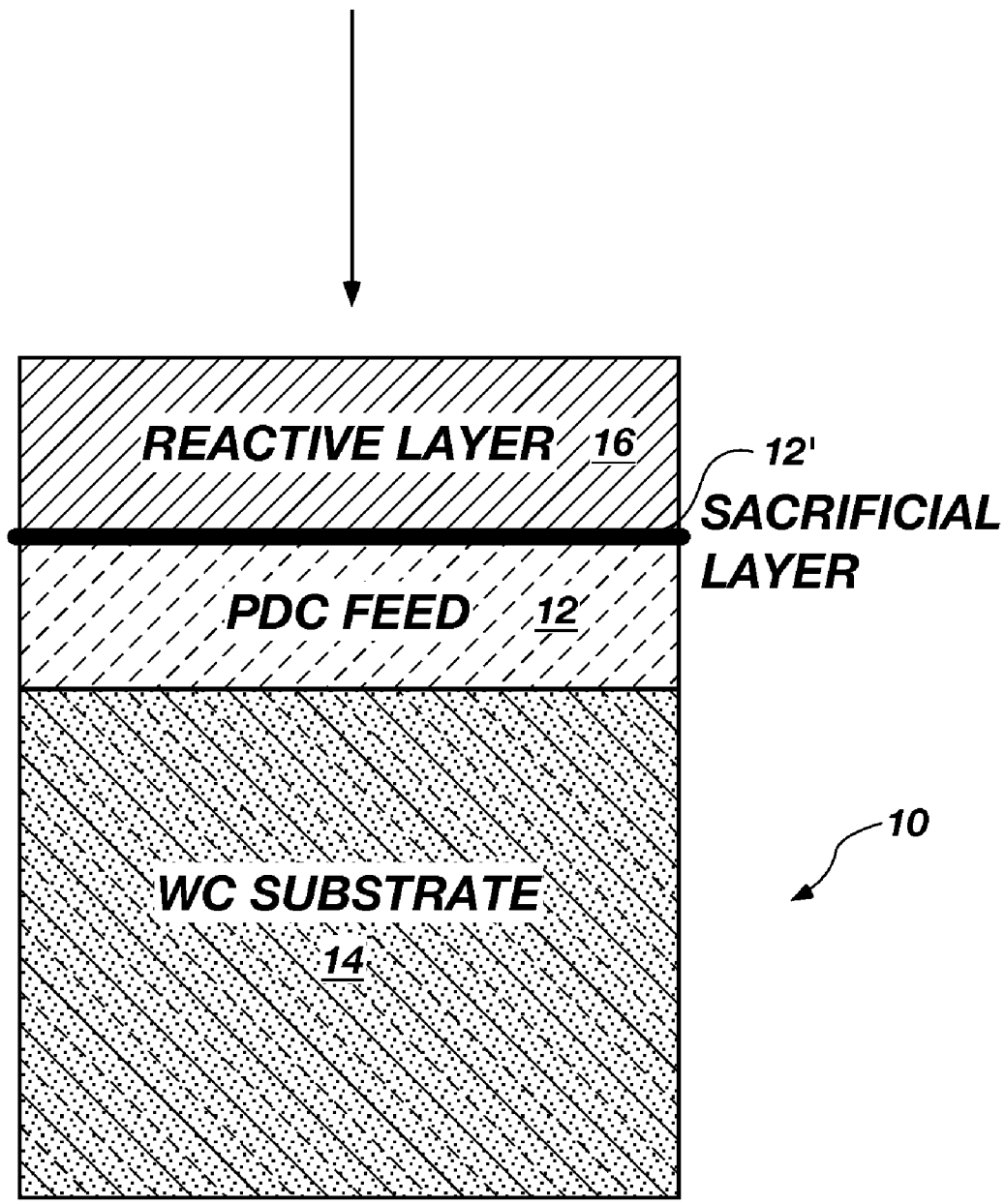
FIG. 5 is a drawing of another embodiment of the present invention of a PDC compact before pressing.

Illustrated in FIG. 5 is another representation of an alternative embodiment of the present invention where a compact 10 is to be pressed under high pressure and high temperature to form a PDC for use as a cutter on a rotary drag bit. The compact 10 includes a substrate 14, a layer of diamond powder 12, a small or thin sacrificial layer of coarse diamond powder 12', when compared to the thickness of the layer 12 of diamond powder, and a reactive sink layer 16. The compact 10 includes at least two layers of diamond, one of diamond powder 12, typically having a particle size of about 5 microns to about 40 microns, and another of sacrificial layer 12' of coarse diamond powder, typically having a particle size of about 100 microns to about 500 microns that are used for forming a diamond table for cutting. A powdered solvent catalyst, such as cobalt powder, is mixed with the diamond powder 12. A sacrificial layer 12' of coarse diamond powder is for forming the diamond table from the diamond powder 12 and sacrificial layer 12' of coarse diamond powder and attaching the diamond table to a substrate 14 formed from tungsten carbide powder for forming a backup substrate for the diamond table after pressing. A sink 16 (a reactive layer) acts as a getter that can react favorably with any cobalt solvent catalyst to reduce the concentration of the cobalt solvent catalyst in the diamond powder 12 and sacrificial layer 12' of diamond powder after pressing and cooling to form a diamond microstructure of a diamond table 12 of the compact 10. The sink 16 may be any suitable material such as fine diamond, graphite, metals, or metal alloys that will react at or, preferably, above the reactivity level of the diamond powder. By placing the sink 16 opposite the tungsten carbide powder of the substrate 14, diamond powder 12, the sacrificial layer 12' of coarse diamond powder, the sink 16 causes a solvent gradient to occur across the diamond powder layer 12 (PCD FEED) having cobalt solvent catalyst therein for the cobalt solvent catalyst to migrate to the sink 16 during high pressure and high temperature formation of the compact 10. Because the sacrificial layer 12' of coarse diamond powder has a particle size in the range of about 100 microns to about 500 microns, the sacrificial layer 12' of coarse porous diamond particle layer 12' will not strongly bond to the diamond layer 12 at the interface therebetween. The overall permeability of the diamond layer 12 and the permeability of the sacrificial layer 12' of diamond powder determines the effectiveness at which the solvent catalyst migrates therethrough during the high pressure and high temperature process of forming the compact 10 as the closed porosity of the diamond layer 12 and the closed porosity of the sacrificial layer 12' of coarse diamond powder prevents any substantial migration of the catalyst thereacross. When there is a large amount of permeability in the diamond layer 12 and permeability in the sacrificial layer 12' of coarse diamond powder, any solvent catalyst in the diamond powder 12 will migrate with a greater effectiveness through the diamond layer 12 and the sacrificial layer 12' of coarse diamond powder. If a diamond powder 12 or a sacrificial layer 12' of coarse diamond powder is used that has mean free path of open porosity below the percolation threshold for the grain size distribution, the permeability of the diamond layer 12 and the sacrificial layer 12' may be such that the catalyst cannot effectively migrate thereacross in any reasonable period of time for the compact formation process.

Figure 6:
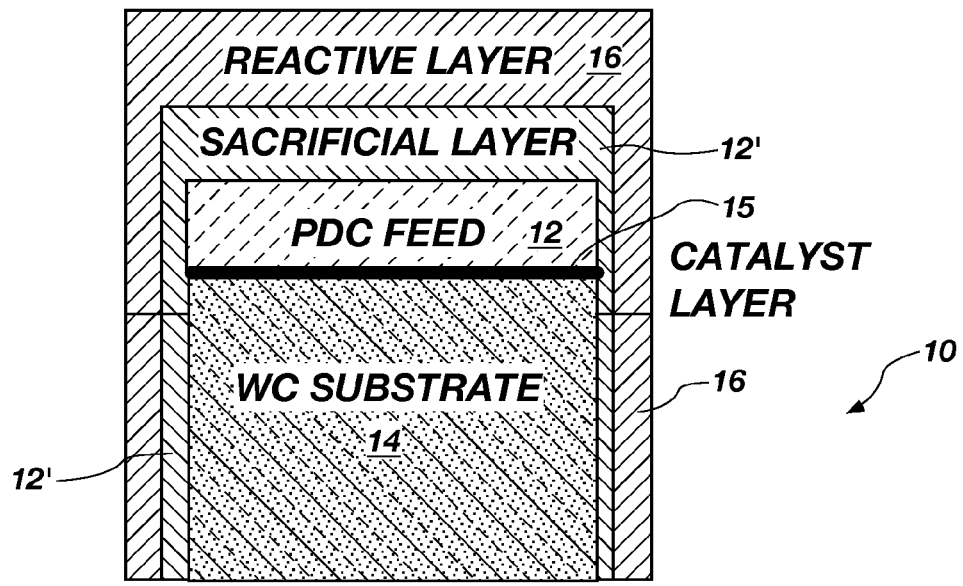
FIG. 6 is a drawing of another embodiment of the present invention of a PDC compact before pressing.

Illustrated in FIG. 6 is another representation of an alternative embodiment of the present invention where a compact 10 is to be pressed under high pressure and high temperature to form a PDC for use as a cutter on a rotary drag bit. The compact includes a substrate 14, a catalyst layer 15, a layer of powdered diamond 12, a sacrificial layer 12' of diamond powder extending around the top surface and circumference of the layer of powdered diamond 12, extending around the circumference of the catalyst layer 15, and extending around the circumference of the substrate 14, and a reactive layer forming a sink 16 extending over the top or upper surface and over or around the entire circumference of the sacrificial layer 12' of diamond powder. The compact 10 includes at least two layers of diamond, one of diamond powder 12, typically having a particle size of about 5 microns to about 40 microns, and another of sacrificial layer 12' of coarse diamond powder, typically having a particle size of about 100 microns to about 500 microns, for forming a diamond table for cutting, each layer 12 and 12' extending around a portion of the tungsten carbide powder 14. A layer of powdered solvent catalyst 15, such as cobalt powder, or solid solvent catalyst disc 15, such as an iron and cobalt alloy disc, contacts the substrate 14 and contacts the powdered diamond 12 for forming the diamond table from the diamond powder 12 and sacrificial layer 12' of diamond powder and attaching the diamond table to a substrate 14 formed from tungsten carbide powder for forming a backup substrate for the diamond table after pressing. A sink or reactive layer 16 extends around the diamond layers 12 and 12' as well as the tungsten carbide powder 14 with the sink or reactive layer 16 acting as a getter that can react favorably with the solvent catalyst 15 to reduce the concentration of the solvent catalyst in the diamond powder 12 and sacrificial layer 12' of coarse diamond powder after pressing and cooling to form diamond microstructure of a diamond table 12 of the compact 10. The sink may 16 be any suitable material such as fine diamond, graphite, metals, or metal alloys which will react at or, preferably, above the reactivity level of the diamond powder. By placing the sink 16 opposite and around the diamond powder 12 and sacrificial layer 12' of diamond powder, the sink 16 causes a solvent gradient to occur across the tungsten carbide powder 14 the diamond powder 12, and the sacrificial layer 12' for any solvent catalyst 15 to migrate to the sink or reactive layer 16 during high pressure and high temperature formation of the compact 10. Because the coarse diamond powder 12' has a particle size in the range of about 500 microns to about 1000 microns, the sacrificial layer 12' of coarse diamond powder will not strongly bond to the diamond layer 12 at any interface therebetween. The overall permeability of the diamond layer 12 and the permeability of the sacrificial layer 12' of coarse diamond powder determines the effectiveness at which solvent catalyst 15 migrates therethrough during the high pressure and high temperature process of forming the compact 10 as the closed porosity of the diamond layer 12 and the closed porosity of the sacrificial layer 12' of coarse diamond powder prevents any substantial migration of the solvent catalyst 15 thereacross. When there is a large amount of permeability in the diamond layer 12 and permeability in the sacrificial layer 12' of coarse diamond powder, the solvent catalyst 15 will migrate with greater effectiveness through the diamond layer 12 and the sacrificial layer 12' of coarse diamond powder. If a diamond powder 12 and/or sacrificial layer of coarse diamond powder 12' is used that has a mean free path of open porosity below the percolation threshold for the grain size distribution, the permeability of the diamond layer 12 and/or the sacrificial layer 12' of coarse diamond powder may be such that the catalyst 15 cannot effectively migrate thereacross in any reasonable period of time for the compact formation process.

Figure 7:
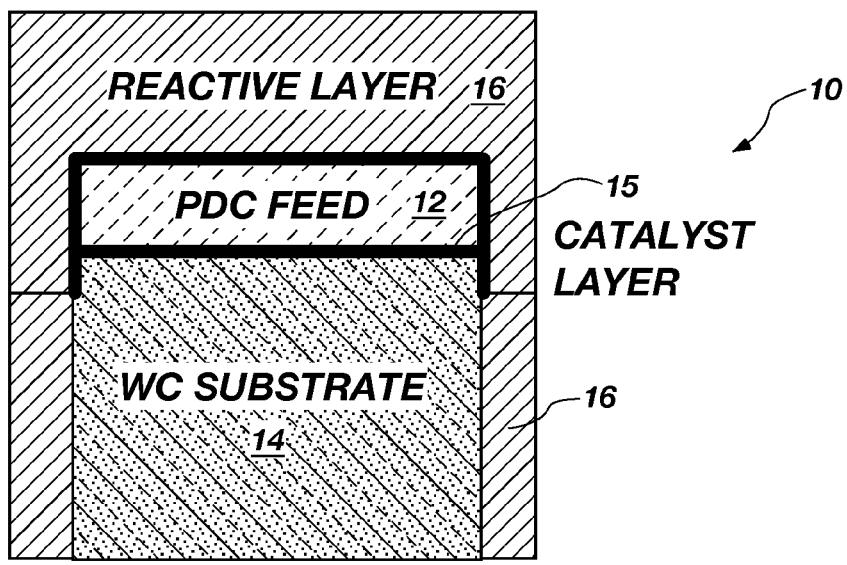
FIG. 7 is a drawing of another embodiment of the present invention of a PDC compact before pressing.

Illustrated in FIG. 7 is another representation of an alternative embodiment of the present invention where a compact 10 is to be pressed under high pressure and high temperature to form a PDC for use as a cutter on a rotary drag bit. The compact 10 includes a substrate 14, a catalyst layer 15, a layer of diamond powder 12 (PCD FEED), and a reactive layer forming a sink 16. The compact 10 includes a layer of diamond powder 12, typically having a particle size of about 5 microns to about 40 microns, for forming a diamond table for cutting. A powdered solvent catalyst 15, such as cobalt powder, extends around the diamond powder 12 on all sides thereof including the circumference thereof and an upper portion of the tungsten carbide powder 14 for forming a backup substrate for 14 the diamond table after pressing. A sink or reactive layer 16 extending around the upper surface and circumference of the powdered solvent catalyst layer 15, and a portion of the tungsten carbide powder 14. The sink or reactive layer 16 acts as a getter that can react favorably with the solvent catalyst 15 to reduce the concentration of the solvent catalyst 15 in the diamond powder 12 after pressing and cooling to form diamond microstructure of a diamond table 12 of the compact 10. The sink may be any suitable material such as fine diamond, graphite, metals, or metal alloys which will react at or, preferably, above the reactivity level of the diamond powder. By placing the reactive sink layer 15 around the solvent catalyst 15 and the tungsten carbide powder 14, the sink causes a solvent gradient to occur across the tungsten carbide powder 14 for the any solvent catalyst 15 to migrate to the sink 16 during high pressure and high temperature formation of the compact 10. The overall permeability of the diamond layer 12 determines the effectiveness at which the solvent catalyst migrates therethrough during the high pressure and high temperature process of forming the compact 10 as the closed porosity of the diamond layer 12 prevents any substantial migration of the solvent catalyst 15 thereacross. When there is a large amount of permeability in the diamond layer 12, the solvent catalyst 15 will migrate with greater effectiveness through the diamond layer 12. If a diamond powder 12 is used that has a mean free path of open porosity below the percolation threshold for the grain size distribution, the permeability of the diamond layer 12 may be such that the solvent catalyst 15 cannot effectively migrate thereacross in any reasonable period of time for the compact formation process.

Figure 8:
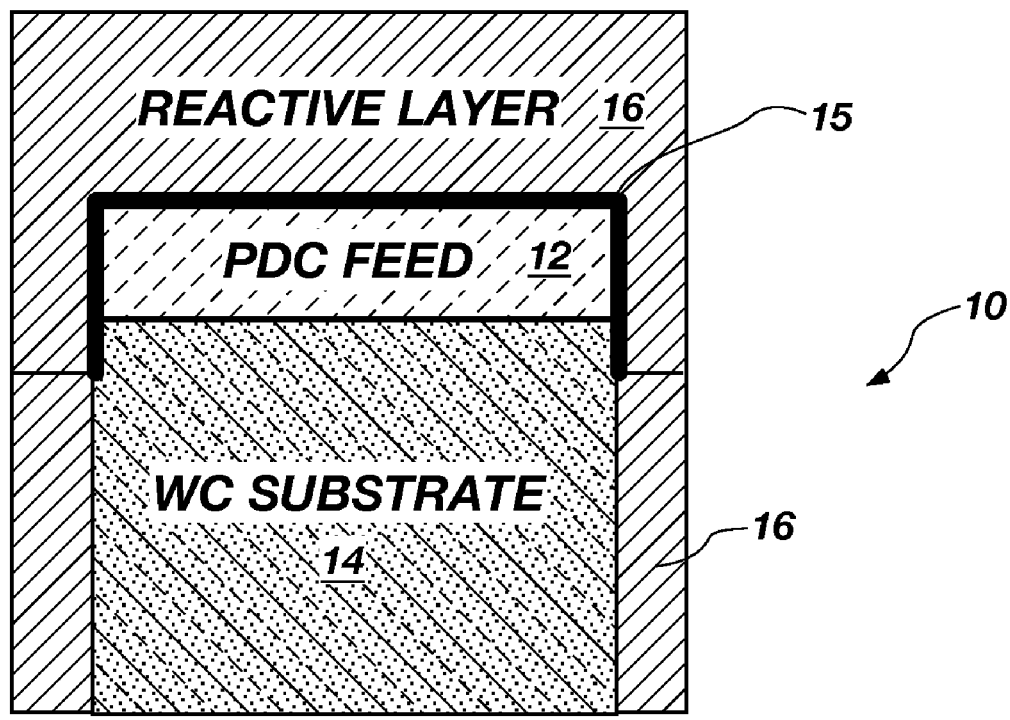
FIG. 8 is a drawing of another embodiment of the present invention of a PDC compact before pressing.

Illustrated in FIG. 8 is another representation of an alternative embodiment of the present invention where a compact 10 is to be pressed under high pressure and high temperature to form a PDC for use as a cutter on a rotary drag bit. The compact 10 includes a substrate 14, a layer of diamond powder 12, a layer of powdered catalyst 15 contacting the layer of diamond powder 12 on the top side and circumference thereof and an upper portion of the substrate 14, and a reactive layer forming a sink 16. The compact 10 includes a layer of diamond powder 12 (PCD FEED), typically having a particle size of about 5 microns to about 40 microns, for forming a diamond table for cutting, a powdered solvent catalyst 15, such as cobalt powder extending around the diamond layer 12 on the upper surface thereof and around the circumference and an upper portion of the tungsten carbide powder 14, any desired amount, for forming the diamond table from the diamond powder 12 and attaching the diamond table to a substrate 14 formed from tungsten carbide powder for forming a backup substrate for the diamond table after pressing. A sink or reactive layer 16 extending around the solvent catalyst layer 15, and a portion of the tungsten carbide powder 14, any desired amount, acting as a getter that can react favorably with the solvent catalyst 15 around the diamond powder layer 12 and any solvent catalyst in the substrate 14 to reduce the concentration of the solvent catalyst 15 in the diamond powder 12 after pressing and cooling to form diamond microstructure of a diamond table 12 of the compact 10. The sink 16 may be any suitable material such as fine diamond, graphite, metals, or metal alloys which will react at or, preferably, above the reactivity level of the diamond powder 12. By placing the sink 16 around the diamond powder 12 and the substrate 14, the sink 16 causes a solvent gradient to occur across the tungsten carbide powder of the substrate 14 for any solvent catalyst 15 to migrate to the sink 16 during high pressure and high temperature formation of the compact 10. The overall permeability of the diamond layer 12 determines the effectiveness at which the solvent catalyst 15 migrates through the diamond powder 12 during the high pressure and high temperature process of forming the compact 10 as the closed porosity of the diamond powder of the layer 12 prevents any substantial migration of the catalyst thereacross. When there is a large amount of permeability in the diamond powder layer 12, any solvent catalyst 15 will migrate with greater effectiveness through the diamond layer 12. If a diamond powder 12 is used that has a mean free path of open porosity below the percolation threshold for the grain size distribution, the permeability of the diamond powder layer 12 may be such that the catalyst cannot effectively migrate thereacross in any reasonable period of time for the compact formation process.

While particular embodiments of the invention have been shown and described, numerous variations and alternative embodiments will occur to those skilled in the art. Accordingly, it is intended that the invention be limited in terms of the appended claims.

What is claimed is:

1. A method of making a compact comprising:
   depositing catalyst material on a substrate;
   depositing diamond powder on the catalyst material;
   depositing a reactive material on the diamond powder, the reactive material formulated to remove catalyst from the diamond powder under high pressure and high temperature; and
   pressing and heating the reactive material, the diamond powder, the catalyst material, and the substrate to form a polycrystalline diamond compact from at least a portion of the diamond powder.

2. The method of claim 1, wherein depositing a reactive material comprises depositing the reactive material opposite the substrate.

3. The method of claim 1, wherein depositing diamond powder comprises:
   depositing a first diamond powder having a first particle size distribution on the substrate; and
   depositing a second diamond powder having a second particle size distribution on the first diamond powder.

4. The method of claim 3, further comprising removing the second diamond powder after forming the polycrystalline diamond material.

5. The method of claim 1, wherein depositing the reactive material comprises depositing one of fine diamond, graphite, metal, and a metal alloy.

6. The method of claim 1, wherein depositing the reactive material comprises depositing crystalline graphite.

7. The method of claim 3, wherein depositing the first diamond powder comprises depositing diamond particles having an average particle size within a range of from about 5 microns to about 40 microns.

8. The method of claim 7, wherein depositing the second diamond powder comprises depositing second diamond particles having an average particle size within a range of from about 100 microns to about 500 microns.

9. The method of claim 3, wherein depositing the second diamond powder comprises depositing diamond particles having multi-modal particle size distribution.

10. The method of claim 1, wherein the diamond powder comprises diamond particles and a wetting agent.

11. The method of claim 1, wherein depositing the catalyst material comprises depositing cobalt powder.

12. The method of claim 1, wherein depositing the catalyst material comprises depositing a solid disc comprising cobalt.

13. The method of claim 1, wherein depositing the catalyst material comprises depositing the catalyst material to extend around a portion of the substrate.

14. The method of claim 1, wherein depositing the diamond powder comprises depositing the diamond powder to extend around a portion of the substrate.

15. The method of claim 1, wherein depositing the reactive material comprises depositing the reactive material to extend around a portion of the diamond powder.

16. The method of claim 1, wherein depositing the reactive material comprises depositing the reactive material to extend around portions of each of the diamond powder and the substrate.

17. The method of claim 1, wherein the catalyst material has at least one aperture extending therethrough.

18. The method of claim 1, wherein the catalyst material has a plurality of apertures extending therethrough.

19. A method of making a compact comprising:
depositing a catalyst material on a substrate;
depositing a first diamond powder on the catalyst material;
depositing a second diamond powder on the first diamond powder;
depositing a reactive material on the second diamond powder, the reactive material formulated to remove catalyst from the first diamond powder and the second diamond powder under pressure and temperature; and
sintering the reactive material, the second diamond powder, the first diamond powder, the catalyst material, and the substrate under high pressure and high temperature to form a polycrystalline diamond compact from the first diamond powder.

20. The method of claim 19, wherein the second diamond powder comprises larger diamond particles than the first diamond powder.

21. The method of claim 19, further comprising removing a material formed from the second diamond powder after forming the polycrystalline diamond compact.

22. The method of claim 19, wherein depositing the reactive material comprises depositing one of fine diamond, graphite, metal, and a metal alloy.

23. A method of forming a polycrystalline diamond compact, comprising:
forming a diamond layer over a substrate;
forming a sacrificial layer on the diamond layer;
forming a reactive layer on the sacrificial diamond layer, the reactive layer comprising a reactive material formulated to be more reactive with catalyst material of the substrate than is a material of the diamond layer;
performing a sintering process to diffuse at least a portion of the catalyst material into each of the diamond layer, the sacrificial diamond layer, and the reactive layer and form a polycrystalline diamond compact from the diamond layer; and
removing the reactive layer and the sacrificial diamond layer after performing the sintering process.

* * * * *

UNITED STATES PATENT AND TRADEMARK OFFICE
CERTIFICATE OF CORRECTION

| | | |
|---|---|---|
| PATENT NO. | : 8,277,722 B2 | Page 1 of 1 |
| APPLICATION NO. | : 12/568966 | |
| DATED | : October 2, 2012 | |
| INVENTOR(S) | : Anthony A. DiGiovanni | |

It is certified that error appears in the above-identified patent and that said Letters Patent is hereby corrected as shown below:

In the specification:
       COLUMN 4,     LINE 21,     change "side FIG." to --side of FIG.--

Signed and Sealed this
First Day of April, 2014

Michelle K. Lee
*Deputy Director of the United States Patent and Trademark Office*